United States Patent [19]
Kato et al.

[11] 3,952,166
[45] Apr. 20, 1976

[54] LOUDSPEAKING TELEPHONE CIRCUIT

[75] Inventors: Kunihiro Kato, Hachiohji; Ryoichi Matsuda, Musashino; Ryoichi Okayasu, Tokyo, all of Japan

[73] Assignee: Nippon Telegraph and Telephone Public Corporation, Tokyo, Japan

[22] Filed: Oct. 3, 1974

[21] Appl. No.: 511,595

[30] Foreign Application Priority Data
Oct. 18, 1973  Japan............................. 48-116367

[52] U.S. Cl............................ 179/81 B; 179/170.6; 179/170.8
[51] Int. Cl.$^2$......................................... H04M 9/08
[58] Field of Search............... 179/1 H, 1 HF, 1 VC, 179/81 A, 81 B, 100 L, 170.6, 170.8

[56] References Cited
UNITED STATES PATENTS

| | | | |
|---|---|---|---|
| 3,660,603 | 5/1972 | Andersen.......................... | 179/1 VC |
| 3,745,262 | 7/1973 | Brolin et al. ...................... | 179/81 B |
| 3,751,602 | 8/1973 | Breeden........................... | 179/1 HF |
| 3,860,756 | 1/1975 | Shinoi et al....................... | 179/1 HF |
| 3,889,059 | 6/1975 | Thompson et al. ............... | 179/81 B |
| 3,902,023 | 8/1975 | Lindgren.......................... | 179/81 B |

OTHER PUBLICATIONS
W. Clark and J. Gale, "A New Look at Loudspeaking Telephones," Telesis Magazine, Bell-Northern Research, 1973, pp. 79-84.

Primary Examiner—Kathleen H. Claffy
Assistant Examiner—Randall P. Myers
Attorney, Agent, or Firm—Charles E. Pfund

[57] ABSTRACT

In the loudspeaking telephone circuit, the speech signal is used as a control signal for detecting the extent of decreasing the acoustic coupling between the loudspeaker and the microphone of the telephone set and of the coupling between the transmitting and receiving circuits of an anti-sidetone circuit from an expected worst condition for which the telephone circuit has been designed thereby automatically decreasing the value of the variable loss utilized for preventing howling by an amount corresponding to said decrease. This circuit provides satisfactory speech communication with a smaller loss inserted than a prior art voice switch thus greatly improving unnatural sound as caused by the voice switch.

13 Claims, 11 Drawing Figures

FIG.2
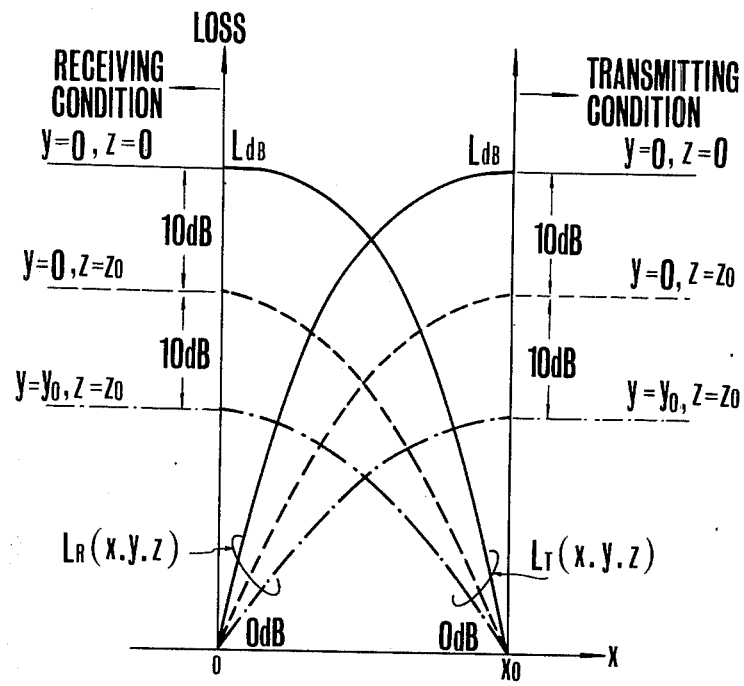
FIG.3
FIG.5
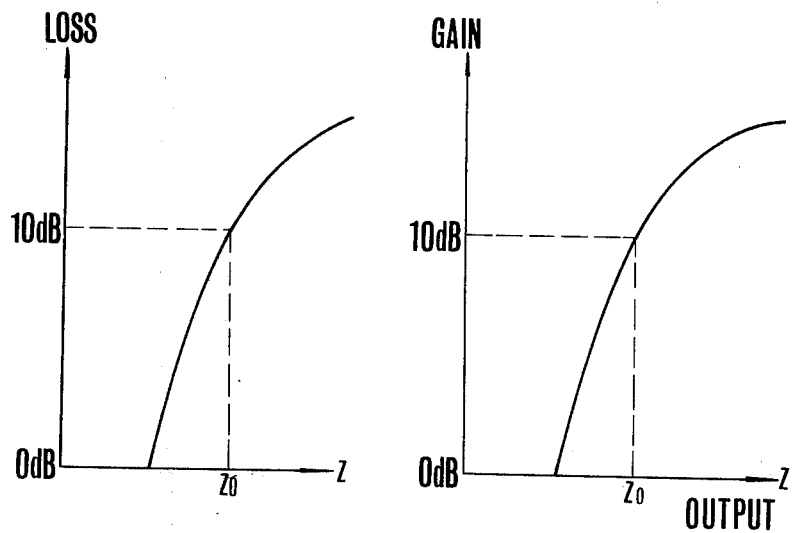

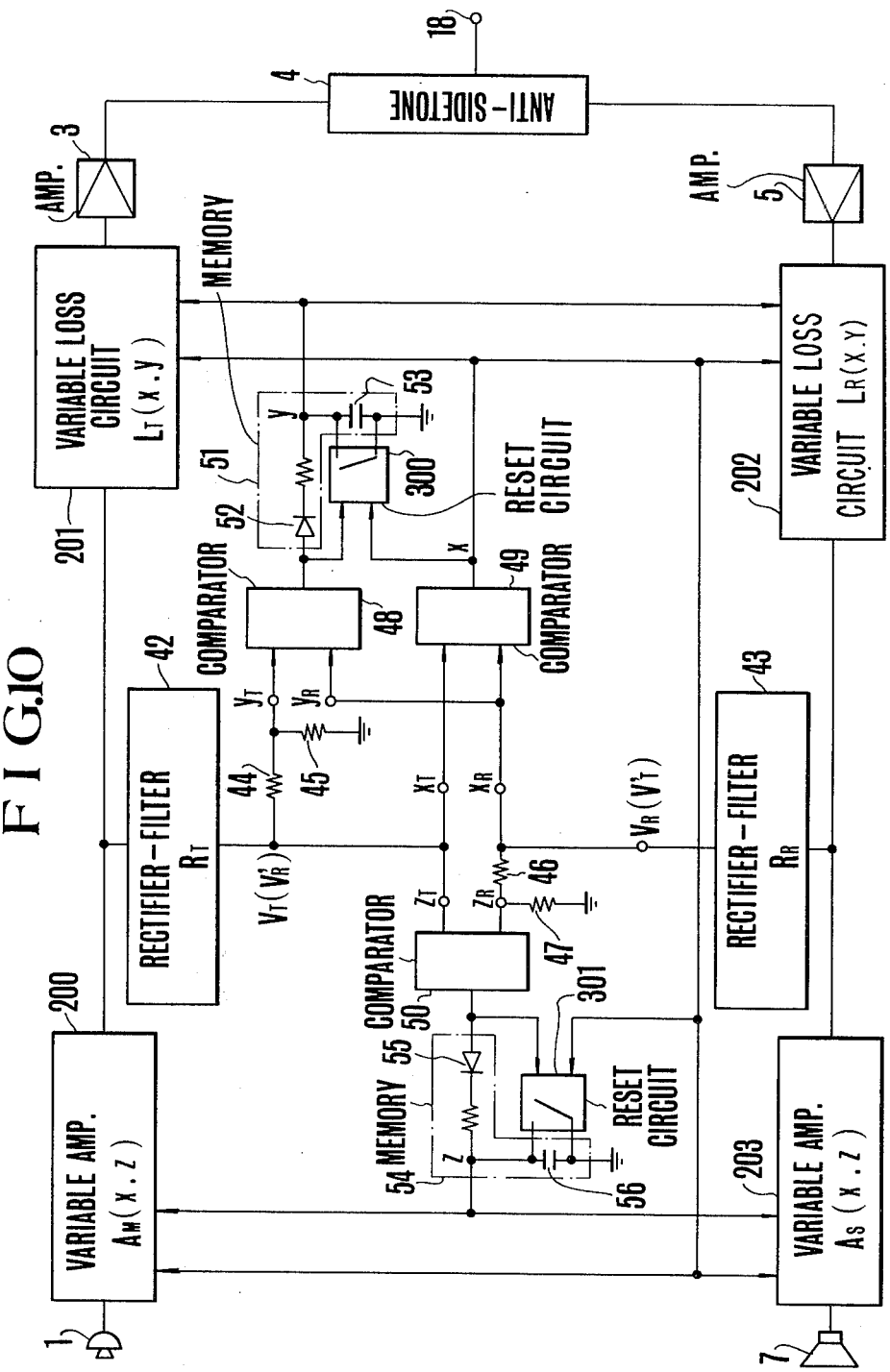

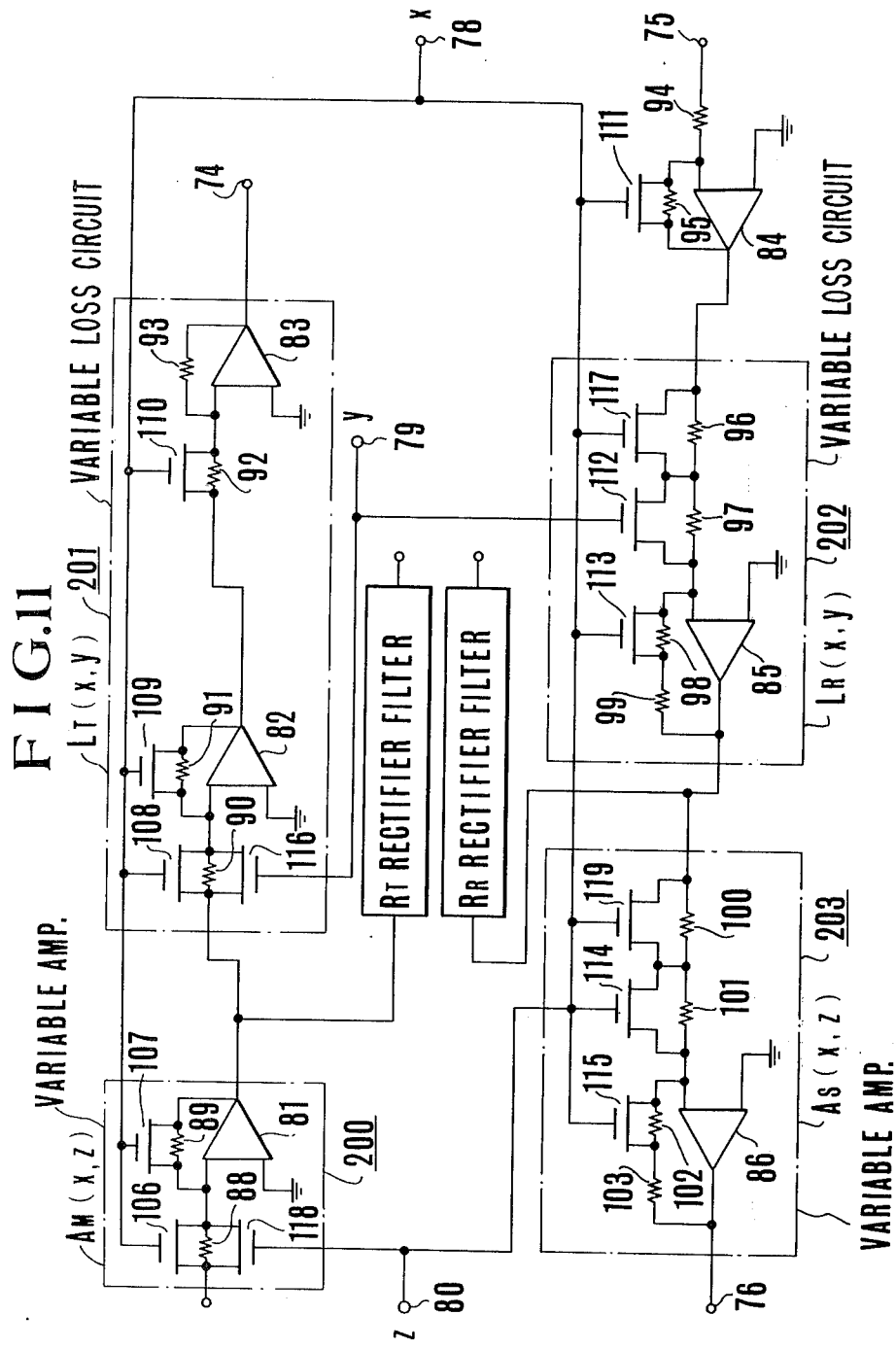

LOUDSPEAKING TELEPHONE CIRCUIT

BACKGROUND OF THE INVENTION

This invention relates to a telephone circuit including a loudspeaker, and more particularly to a telephone circuit wherein the magnitude of the loss inserted in the telephone circuit for the purpose of preventing howling of a loudspeaking telephone set is automatically varied in accordance with the condition of use of the telephone set.

As is well known in the art, a prior art loudspeaking telephone set comprises a telephone circuit including a microphone, a transmitting amplifier, an anti-sidetone circuit, a receiving amplifier and a loudspeaker; and a voice switch with its one side connected with the microphone and the loudspeaker of the telephone circuit and the other side connected with an anti-sidetone circuit. The purpose of the voice switch connected as described above is to prevent howling caused by the acoustic coupling between the microphone and the loudspeaker. More particularly, due to the presence of an amount of the acoustic transmission $\alpha$ between the microphone and the loudspeaker systems, and an amount of the transmission $\beta$ on the other side through the anti-sidetone circuit, when the gain of the loop comprised by these $\alpha$ and $\beta$ transmission exceeds a unity, howling occurs. For this reason, the voice switch is used such that it inserts a loss in the receiving circuit by detecting the transmitting signal sent by a user (this condition of the circuit is termed a "transmitting condition") and inserts a loss in the transmitting circuit by detecting a received signal at the time of reception (this condition of the circuit is termed a "receiving condition"). In this manner, by the insertion of a loss $L[dB]$ in the speech circuit the gain of said loop is maintained below $0[dB]$, thereby preventing the howling. As described above, the value of the loss $L[dB]$ to be inserted in the speech circuit is determined by the magnitude of the sum $(\alpha+\beta)$ $[dB]$. The magnitude of $\alpha$ increases as the distance between the loudspeakers and the microphone decreases whereas the value of $\beta$ increases as the sidetone balance is lost. For this reason, when designing a loudspeaking telephone set the value of the loss $L[dB]$ inserted by the voice switch has been determined such that the loss $L[dB]$ inserted is larger than the sum of the maximum values of $\alpha$ and $\beta$ which may occur during the use of the telephone set so as to prevent the howling in any operating condition.

As an example, the numerical data where the line loss connected with the telephone set is $10[dB]$ will be described hereinunder. Suppose now that the distance between the loudspeaker and the microphone is equal to 50 cm., and that the impedance of the line connected to the telephone set is equal to 600 ohms, the value of the required loss will be approximately $L = 10[dB]$. However, when the user approaches the loudspeaker to the microphone to a distance of 10 cm., the acoustic coupling between the loudspeaker and the microphone will be increased by about 20 log (50/10) $\cong 14[dB]$. In other words, the value of $\alpha$ increases by $14[dB]$. Moreover, when telephone sets are interconnected through a telephone exchange, the impedance of the telephone line termination is momentarily opened so that the line impedance connected to a telephone set becomes much larger than the inherent line impedance. Under these conditions, the anti-sidetone characteristic decreases by $6[dB]$ comparing with a 600 ohm line impedance thereby increasing the value of $\beta$ by $6[dB]$. Namely, to prevent howling when the line termination is opened, with a distance of 10 cm. between the microphone and the loudspeaker, it is necessary to increase the loss inserted by the voice switch by an amount corresponding to the increase in the values of $\alpha$ and $\beta$ than the aforementioned case in which $L = 10[dB]$. Thus, the required loss amounts to $L = 30[dB]$. In this manner, the prior art loudspeaking telephone set is designed such that a loss of $L = 30[dB]$ is inserted by the voice switch where the line loss is equal to $10[dB]$. Since the value of the "loss L" is determined by considering the worst condition of the use of the loudspeaking telephone set from the viewpoint of howling, in most cases, a loss larger than that required is inserted, so that the speech signals during transmission and reception are interrupted by the voice switch thus making it difficult to communicate with a loudspeaking telephone set.

Furthermore, in a conventional loudspeaking telephone set, since the voice switch inserts a loss in either one of the transmitting and receiving channels during talking, when two talkers speak simultaneously either one of the signals is attenuated by the inserted loss with the result that there is a case in which it would be impossible to listen to the signal if the inserted loss were too large. It has also been recognized that since in order to switch the loss in the transmitting and receiving channels it is necessary to compare the levels of the transmitted and received signals and since the switching of the loss accompanies a time lag, when one of the talkers offers while the other talker speaks or immediately after completion of his speech, the initial syllables of the speech burst of the signal of the offering party will be interrupted due to the loss inserted by the voice switch thus obscuring the speech. Further, in an environment in which room noise is excessive or a large line noise exists, the loss inserted by the voice switch will be kept in the transmitting or receiving channel by the noise thereby disenabling mutual communication.

SUMMARY OF THE INVENTION

Accordingly, it is an object of this invention to provide an improved loudspeaking telephone circuit in which the difference between said transmitted amounts of $\alpha$ and $\beta$ and the transmitted amounts of $\alpha$ and $\beta$ under the worst condition expected at the time of designing the loudspeaking telephone set is detected and memorized for variably controlling the gain.

Another object of this invention is to provide an improved loudspeaking telephone circuit including a voice switch capable of automatically decreasing the value of the loss inserted by the voice switch to a minimum value which is necessary to prevent howling in accordance with the condition of using the telephone set.

Still another object of this invention is to provide a novel loudspeaking telephone circuit in which when the user begins to talk, the voice signal, that is the output of a microphone, is compared with a sidetone signal introduced into the receiving channel via an anti-sidetone circuit and the result of comparison is compared with that which occurs under the worst anti-sidetone characteristic, in other words, the degree of superiority of the anti-sidetone charactristic over that of the worst condition is detected so as to decrease the loss inserted by the voice switch by an amount equal to the extent of improvement of the anti-sidetone characteristic.

A further object of this invention is to provide an improved loudspeaking telephone circuit in which when the user receives a signal, a portion of the received signal and a received signal detected by the microphone through the acoustic field (this signal is hereinafter termed "round signal") are detected for comparing their levels so as to determine the difference of the distance between the loudspeaker and the microphone from that occurring at the worst condition thereby decreasing the loss inserted by the voice switch by an amount corresponding to the decrease in the acoustic coupling.

According to this invention, there is provided a loudspeaking telephone circuit comprising a first rectifier-filter circuit for rectifying and filtering a transmitting signal through a transmitting circuit, a second rectifier-filter circuit for rectifying and filtering a receiving signal by a receiving circuit, a main comparator for comparing the outputs from the first and second rectifier-filter circuits, a resistance attenuator for attenuating at least one of the outputs from the first and second rectifier-filter circuits, a control comparator for comparing the output from the resistance attenuator with the not attenuated outputs from the first and second rectifier-filter circuits, a memory device for memorizing the output from the control comparator, and transmitting circuit variable loss means and receiving circuit variable loss means which give an insertion loss to a speech circuit by utilizing the output from the memory device and the main comparator as a parameter.

BRIEF DESCRIPTION OF THE DRAWINGS

Further objects and advantages of the invention can be more fully understood from the following detailed description taken in conjunction with the accompanying drawings in which

FIGS. 2 and 3 are graphs showing the characteristics of the variable loss circuit utilized in this invention;

FIG. 5 is a graph showing the characteristic of a control amplifier utilized in the circuit shown in FIG. 4;

FIGS. 10 and 11 are connection diagrams showing another embodiment of this invention.

DESCRIPTION OF THE PREFERRED EMBODIMENTS

Figure 1:
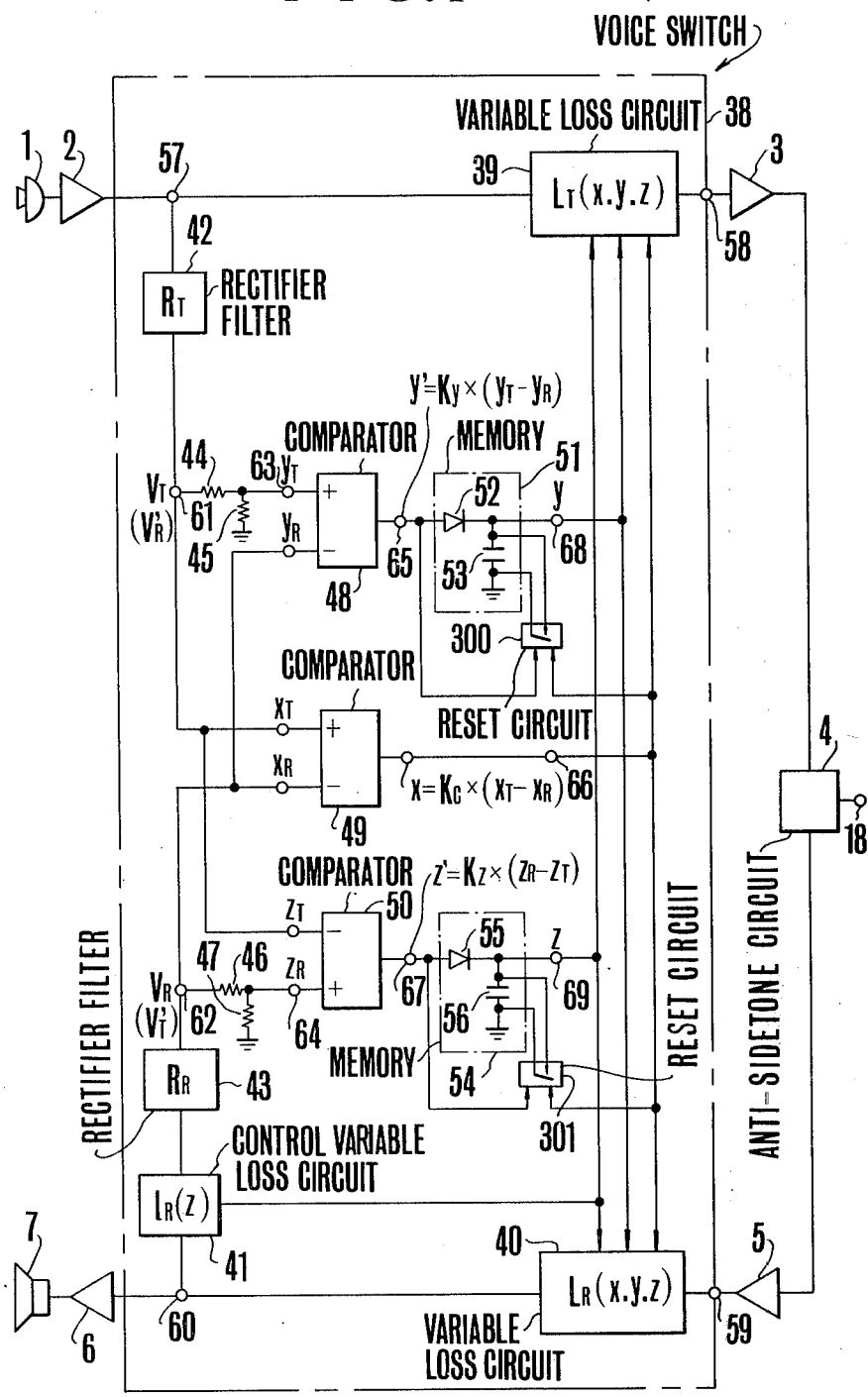
FIG. 1 is a block diagram showing one embodiment of the novel loudspeaking telephone circuit embodying the invention.

A preferred embodiment of this invention shown in FIG. 1 of the accompanying drawing comprises a well known telephone circuit including a microphone 1, transmitting amplifiers 2 and 3, an anti-sidetone circuit 4, receiving amplifiers 5 and 6 and a loudspeaker 7, and a voice switch 38 which characterizes the invention.

In the voice switch 38, the input terminal 57 of a variable loss circuit 39 and the output terminal 58 thereof are connected to the output terminal of the transmitting amplifier 2 and the input terminal of the transmitting amplilfier 3, respectively, whereas the input terminal 59 and the output terminal 60 of a variable loss circuit 40 are connected to the output terminal of the receiving amplifier 5 and the input terminal of the receiving amplifier 6. The input terminal 57 is coupled to the $X_T$ terminal of a comparator 49 through a rectifier-filter circuit 42 while the output terminal 60 is connected to the $X_R$ terminal of the comparator 49 via control variable loss circuit 41 and a rectifier-filter circuit 43. The output terminal 61 of the rectifier-filter circuit 42 is coupled to the input terminal $Y_T$ of a comparator 48 via a resistance attenuator composed of resistors 44 and 45 while the $Y_R$ terminal of the comparator 48 is connected to the output of the rectifier-filter circuit 43. The output of this circuit 43 is also coupled to the input terminal $Z_R$ of comparator 50 via a resistance attenuator including resistors 46 and 47, the $Z_T$ input terminal of comparator 50 being connected to the output terminal 61 of the rectifier-filter circuit 42. The output terminal 65 of the comparator 48 is connected to a memory circuit 51 constituted by a diode 52 and a capacitor 53. Similarly, the output terminal 67 of the comparator 50 is connected to a memory circuit 54 constituted by a diode 55 and a capacitor 56. The output terminal 66 of comparator 49 producing an output at a level $x$, the output terminal 68 of memory circuit 51 producing an output at a level $y$ and the output terminal 69 of the memory circuit 54 producing an output at a level $z$ are connected to the variable loss circuits 39 and 40 provided for the purpose of preventing the howling, and the output terminal 69 of the memory circuit 54 is connected to the control variable loss circuit 41.

FIG. 2 is a graph showing the qualitative control characteristics of the variable loss circuits 39 and 40 shown in FIG. 1 and provided for preventing howling, in which the abscissa represents the output $x$ of the comparator 49 and the ordinate the values of the variable losses $L_T(x,y,z)$ and $L_R(x,y,z)$ of the variable loss circuits 39 and 40. The parameters $y$ and $z$ show the levels of the outputs of the memory circuits 51 and 54. As can be noted from FIG. 2, variable losses $L_T$ and $L_R$ vary oppositely with respect to the output $x$ of the comparator 49 just in the same manner as the characteristics of a prior art variable loss circuit, thereby determining the transmitting and receiving conditions. As shown by dotted line curves and dot and dash line curves the control is performed such that the loss inserted by the variable loss circuits $L_T$ and $L_R$ decrease as the outputs $y$ and $z$ from the memory circuit 51 and 54, respectively, increase. FIG. 3 is a graph showing the control characteristic of the variable loss $1_R(z)$ provided by the control variable loss circuit 41 in which the ordinate shows the value of the variable loss $1_R(z)$, whereas the abscissa the output level $z$ of the memory circuit 54. As shown the value of $1_R(z)$ increases with the increase in the value of $z$.

The operation of the embodiment shown in FIG. 1 will now be described with reference to FIGS. 1 to 3. Where the outputs $y$ and $z$ of the memory circuits 51 and 54 are zero, the circuit shown in FIG. 1 operates in the same manner as a well known circuit. Accordingly, when a receiving signal is received, the control signal level $V_R$ of the receiving signal appearing at terminal 62 is always larger than the round signal $V'_R$ of the received signal, which appears at the terminal 61 thereby preparing the circuit for the receiving condition ($x<0$). Also when the transmitting signal is applied, the control signal level $V_T$ of the transmitting signal appearing at the terminal 61 is always larger than the round signal level $V'_T$ of the transmitting signal appearing at the terminal 62 thus preparing the circuit for the transmitting condition ($x$  $x0$). Where signals $y$ and $z$ are positive ($y,z>0$), the losses $L_T$ and $L_R$ inserted for the purpose of preventing the howling decrease in accordance with the characteristics shown in FIGS. 2 and 3 whereby the control loss $1_R$ increases.

The operation of the circuit will be described hereunder with typical numerical values.

Assuming now that the distance between the loudspeaker and the microphone is 10 cm. and that the opening of the line termination corresponds to the worst condition. Let us now consider a loudspeaking telephone set which is designed under said worst condition such that, for both transmitting and receiving inputs, the level of the control signal will be higher than the round signal level by 6dB which is equal to about twice times of that of the round signal. When it is assumed that the resistance attenuators 44 ~ 47 provide an attenuation of 6dB, the outputs $y$ and $z$ of the memory circuits under said worst condition will be as follows. Although $V_R \cong Z V'_R$ for the receiving input, the control signal level $V_R$ is attenuated by the resistance attenuator 46 and 47 and the round signal $V'_R$ is attenuated by the resistance attenuator 44 and 45. Accordingly, the two inputs to the comparator 48 will have a relation $Y_T < Y_R$ so that the output $y'$ is negative. When $y' < 0$, diode 52 is not conductive and hence $y = 0$. Thus, the loss caused by signal $y$ is not controlled. The two inputs ($Z_T$, $Z_R$) to the comparator 50 have a relation $Z_T = Z_R$, the output $z'$ is also zero so that the loss caused by signal $z$ is not controlled. In the same manner, for the transmitting input, the output of the comparator 48 is zero, whereas the output of comparator 50 is negative with the result that no control is effected by signals $y$ and $z$.

Suppose now that the distance between the loudspeaker and the microphone is increased, that the acoustic coupling therebetween is decreased 10dB than that under said worst condition, and that the anti-sidetone characteristic of the anti-sidetone circuit is improved 10dB than that under said worst condition with respect to the subscribers line connected to the telephone set so that the round signal of the transmission signal is decreased 10dB than that under the worst condition. The operation of the circuit under these conditions is as follows.

Figure 4:
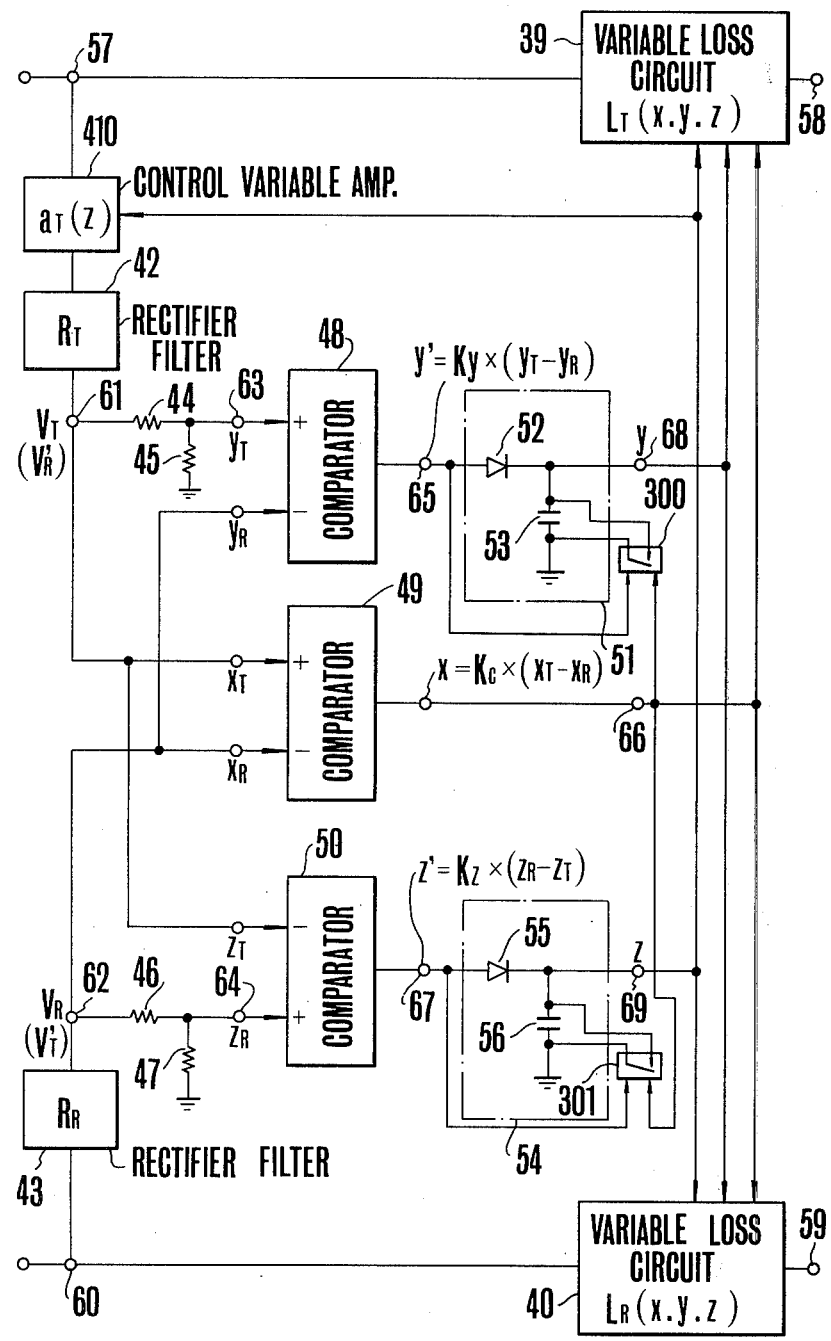
FIG. 4 shows a block diagram of a modified embodiment of this invention.

When a receiving signal is received, the round signal $V'_R$ becomes smaller than the control signal $V_R$ by 16 dB due to the decrease in the acoustic coupling between the loudspeaker 7 and the microphone 1 so that the output $x$ of the comparator 49 becomes negative thus preparing the circuit for the receiving condition. In other words, the variable loss $L_R$ on the receiving side will become 0dB and the variable loss $L_T$ on the transmitting side will become L[dB]. On the other hand, the output $y'$ of the comparator 48 becomes negative so that no control is performed by the signal $y$. However, the input $Z_R$ to the comparator 50 are attenuated 6dB by the resistance attenuator 46 and 47, so that the level of the input $Z_R$ to the terminal 64 is larger than the level of the other input $Z_T$ by 10dB. As a consequence, the output of the comparator 50 becomes positive and through the diode 55 signal $z$ is charged in the memory capacitor 56, thus beginning the control by signal $z$. As this signal $z$ increases the control variable loss circuit 41 functions to insert a loss into the circuit in accordance with the control characteristic shown in FIG. 5 so that the signal level $V_R$ at the terminal 62 is subjected to attenuation. Since this control is a negative feedback control provided by a closed loop in which the variable loss circuit 41 on the input side is controlled by the output from the comparator 50 the control is proceeded until two inputs ($Z_T$, $Z_R$) become substantially equal, with each other, provided that the gain of the comparator 50 is sufficiently large. As a consequence, the loss inserted by the variable loss circuit 41 approaches the level difference (10dB) between two inputs $Z_R$ and $Z_T$ before commencement of the control, which is equal to the aforementioned amount of decrease (10dB) in the acoustic coupling between the loudspeaker 7 and the microphone 1. Denoting the ultimate value of $z$ by $z_0$, this value $z_0$ is memorized in the memory capacitor 56. On the other hand, as shown in FIGS. 4 and 5, since the variable losses $L_T$ and $L_R$ for preventing howling are designed such that they function oppositely as the variable loss $1_R(z)$ with respect to signal $z$, the loss $L_T$ and $L_R$ inserted by the variable loss circuits 39 and 40, respectively are decreased by signal $z_0$ by 10dB.

As described hereinabove, according to the novel loudspeaking telephone circuit of this invention, the received signal is used as the control signal for comparing the degree of the acoustic coupling between the loudspeaker and the microphone with that under the worst condition for which the circuit is designed thereby decreasing the loss inserted for the purpose of preventing howling by an amount corresponding to the decrease in the degree of the acoustic coupling.

Let us now consider a case wherein the transmitting signal is received. Under the assumed condition since the anti-sidetone characteristic is better than that under the worst condition by 10dB, the level of the transmitting control signal $V_T$ is higher than that of the round signal $V'_T$ by 16dB. For this reason, the output $x$ from the comparator 49 becomes positive with respect to the transmitting signal so that the circuit is prepared for the transmitting condition ($L_T = $ 0dB, $L_R = $ LdB). At this time, the output $z'$ from the comparator 50 becomes negative and the diode 55 is cut off so that the signal level $z_0$ that has been memorized in the capacitor 56 would not be affected by the transmitting signal. Since the loss caused by the attenuator comprised by resistors 44 and 45 amounts to 6dB, the level of the input $Y_T$ to terminal 63 is higher than the level of the input $Y_R$ to the other input by 10dB. As a consequence, the output from comparator 48 becomes positive whereby the control effected by the signal $y$ is commenced. The control provided by signal $y$ is performed in such a manner that the inserted losses $L_T$ and $L_R$ decrease as the signal $y$ increases in the same manner as the control provided by the signal $z$. However, under the transmitting condition, since $L_T = $ 0dB and $L_R = $ L[dB], when the inserted loss L[dB] controlled by the signal $y$ decreases, the round signal $V'_T$ of the transmitting signal increases. Similar to the control effected by the signal $z$, this control is also a negative feedback control through a closed loop so that the control proceeds until a condition $Y_T \cong Y_R$ is reached. Inasmuch as the difference between the levels of signals $Y_T$ and $Y_R$ before control is equal to the amount of improvement (10dB) of the anti-sidetone characteristic under the worst condition, the inserted loss L[dB] will be reduced by 10 dB as a result of the control. The value of the signal $y$, that is $y_0$ at this time, is memorized in the memory capacitor 53.

The operating characteristics of the circuit shown in FIG. 1 can be shown by the characteristics shown in FIG. 2. More particularly when the receiving signal exists, $y = 0$ and $z = z_0$ so that the inserted loss will become smaller by 10dB corresponding to the decrease in the acoustic coupling between the loudspeaker and the microphone. Further, when a transmitting signal is applied $y = y_0$ and $z = z_0$ so that the insertion loss becomes smaller by 10dB which is substantially equal to the improvement (10dB) in the anti-sidetone characteristic. In other words, under the final condition wherein $y = y_0$ and $z = z_0$ the loss inserted by the voice switch 38 will be smaller than that inserted by the voice switch of the prior art circuit by 20dB.

In the embodiment described above, the intensity of the acoustic coupling between the loudspeaker and the microphone and the anti-sidetone characteristics are detected and the control signals $y$ and $z$ corresponding thereto are memorized in the memory capacitors 53 and 56. Accordingly, assume now that the user uses the telephone set with the microphone and loudspeaker spaced 50 cm, the control signal $z$ corresponding to this distance is memorized. Then if the distance between the microphone and the loudspeaker is varied to 10 cm, since the initial control signal $z$ is continuously memorized, the loss inserted by the voice switch will be decreased excessively thus causing howling in some cases. According to this invention, in order to obviate this difficulty where the loss inserted by the voice switch was caused to decrease excessively by the control signal $y$ or $z$ there are provided reset circuits 300 and 301, as shown in FIG. 1 which operate to immediately erase the control signals $y$ and $z$ that have been memorized in the memory circuits 51 and 54 and then store in these memory circuits new control signals corresponding to newly set external conditions (that is the distance between the loudspeaker and the microphone and the anti-sidetone characteristic). The operation of the reset circuits 300 and 301 are as follows.

Receiving condition will firstly be considered. When a signal is received, the output of the comparator 50 increases in the positive direction with the result that control signal $z$ is stored in the memory capacitor 56. As a consequence, the losses $L_T$, $L_R$ inserted by the voice switch are decreased by the control signal $z$ as has been pointed out hereinabove. When the user brings the loudspeaker closer to the microphone under these conditions, the level of the round signal detected by the microphone increases thus increasing the level of one input $Z_T$ to the comparator 50. Accordingly, the output from this comparator increases in the negative direction from a positive value. The reset circuit 301 supervises the polarity of the output of the comparator 50 and when the polarity of the output changes to negative the reset circuit 301 operates to short the memory capacitor 56 thus erasing the control signal $z$ that has been stored therein. In this manner, the misoperation described above can be prevented. Upon erasure of the stored control signal $z$, the controlled loss $1_R(z)$ is removed thereby increasing the input $Z_R$ to the comparator 50. As a result, the output from the comparator 50 again becomes positive and the reset circuit 301 is disenabled. Thus, a new control signal $z$ is established corresponding to newly set external condition.

The output polarity of the comparator 50 becomes also negative, in addition to the above described case of misoperation during the receiving condition, in a case where the circuit is turned to the transmitting condition in response to a transmitted signal. Because in this case the two inputs will have a relation $Z_T > Z_R$, the output from the comparator 50 is negative. However, since this relation corresponds to a level relation inherent to the transmitting condition, it is different from the misoperation of the circuit detected by the received signal. Accordingly, it is necessary to disenable the reset circuit 301 when the circuit is turned to the transmitting condition. As it is possible to readily discriminate the transmitting condition and the receiving condition of the circuit by the polarity of the output from the comparator 49, it is possible to disenable the reset circuit 301 by utilizing the polarity of the output $x$ of the comparator 49 when the circuit is turned to the transmitting condition ($x > 0$). In other words, the reset circuit 301 operates only when the circuit is in the receiving condition so as to erase the control signal $z$ that has been stored by detecting the fact that the polarity of the output from the comparator 50 has changed to negative when the user brings the loudspeaker closer to the microphone.

In the same manner, the reset circuit 300 operates only when the circuit is set in the transmitting condition. More particularly, during speech, if a third party uses a branch telephone set thus deteriorating the anti-sidetone characteristic, the polarity of the output from the comparator 48 becomes negative whereby the control signal $y$ that has been stored in the memory capacitor 53 of the memory circuit is erased by the action of the reset circuit 300.

As has been described hereinabove, the circuit shown in FIG. 1 is constructed to control the loss inserted by detecting the degree of the anti-sidetone characteristic and to control the loss inserted by detecting the magnitude of the acoustic coupling between the microphone and the loudspeaker. However, it will be clear that it is also possible to prevent the howling by using either one of the circuits that apply control signals $y$ and $z$ to the output terminals 68 and 69 of the memory circuits 51 and 54 shown in FIG. 1 for controlling the inserted loss in accordance with either one of the two pprameters described above parameters anti-sidetone characteristic and the magnitude of the acoustic coupling.

In this invention the voice switch VS is not limited to the circuit illustrated in FIG. 1 but the voice switch shown in FIG. 4 to be described later can also be used with the same advantageous results. More particularly, in the modified embodiment of the voice switch shown in FIG. 4, the control variable loss circuit 41 for providing variable loss $1_R(z)$ shown in FIG. 1 is eliminated and a control amplifier 410 having a characteristic $A_T(z)$ just opposite to that of the variable loss $1_R(z)$ is included on the input side of the rectifier-filter 42. Remaining connections are identical to those of the voice switch 38 shown in FIG. 1. The characteristic of the control amplifier 410 is shown in FIG. 5 in which the abscissa represents the output $z$ of the memory circuit 54 and the ordinate the gain of the amplifier 410.

Although, in the circuit shown in FIG. 1 the control signal $Z_R$ of the received signal applied to the comparator 50 is compressed by the control variable loss circuit 41 when detecting the receiving signal by the comparator 50, in the circuit shown in FIG. 4, other input signal ($Z_T$) to the comparator 50 is amplified and controlled by the control amplifier 410. However, the principle of the operation of both embodiments is the same. In these embodiments, the resistance attenuators (44, 45 or 46, 47) utilized for detecting the difference in the levels of the control signal for transmission and reception and of the round signal and the comparator (48 or 50) may be substituted by a divider that detects the ratio of the levels of two input signals.

In the foregoing embodiments, voice signals are rectified and filtered and the losses are controlled by speech signals at a mean level so that the frequency characteristic of the system has been neglected. Actually however, the coupling between the microphone and the loudspeaker and the anti-sidetone characteristic depend upon the frequency or phase and these characteristics are generally different depending upon the operating condition of the telephone set. Especially, howling is readily caused at a frequency at which the coupling between the microphone and the loudspeaker is a maximum. With the described embodiments, however, it is impossible to detect the frequency at which the maximum coupling occurs, so that in some cases the loss decreased by the control might be excessive thus causing howling. But, it is possible to solve this problem by making the amount of attenuation provided by the resistance attenuators 44 to 47 shown in FIG. 1 to be slightly larger than the difference in the levels (6dB in this example) of the control signal and the round signal under the worst condition.

In the embodiment shown in FIG. 1 two rectifier-filter circuits 42 and 43 are used. However, where the rate of change required for signals $x$, $y$ and $z$ is not equal, it is necessary to provide discrete rectifier-filter circuits for either one or all of the input signals to comparators 48, 49 and 50.

A preferred example of the variable loss circuits $L_T$, $L_R$ and $1_R$ will now be described with reference to FIGS. 6 to 9 inclusive.

Figure 6:
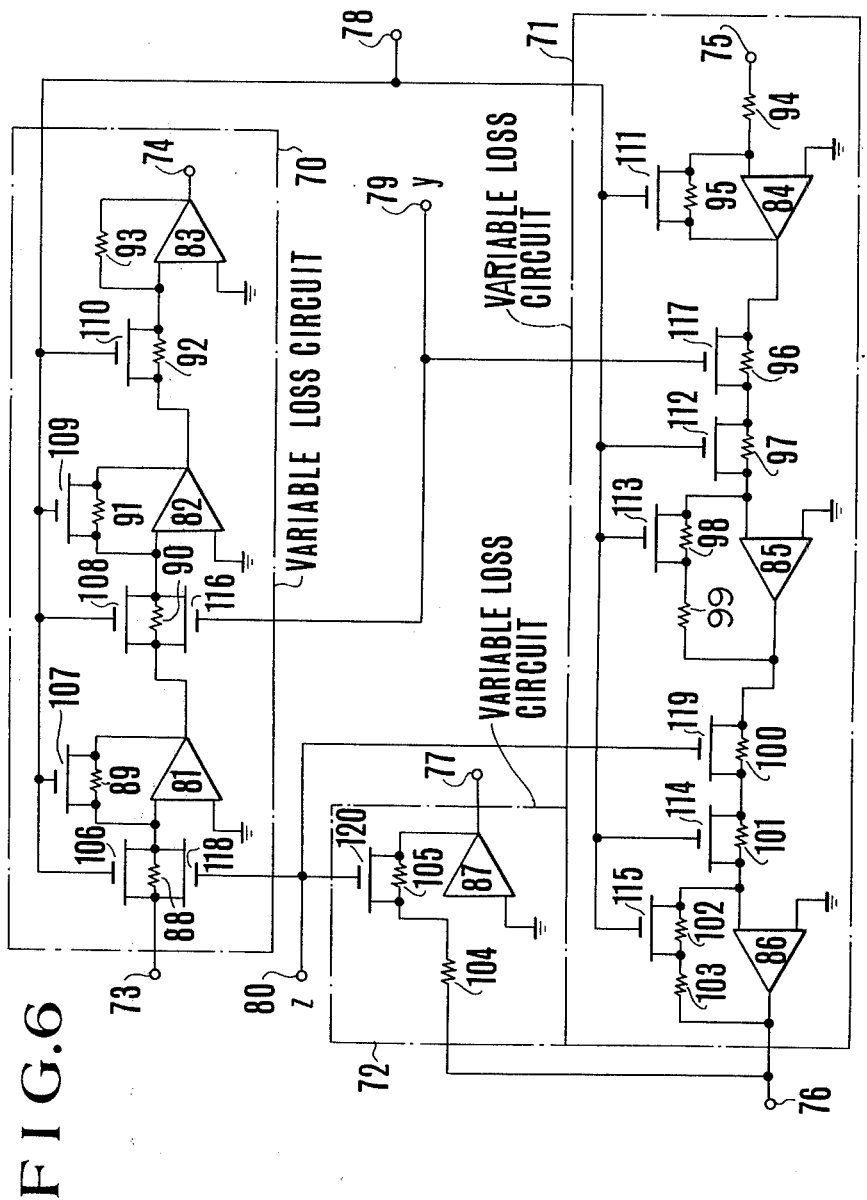
FIG. 6 shows a detailed connection of a variable loss circuit utilized in this invention.

In FIG. 6, reference numeral 70 shows the variable loss circuit $L_T$ designated by 39 in FIG. 1, 71 the variable loss circuit $L_R$ designated by 40 in FIG. 1, and 72 the variable loss circuit $1_R$ designated by 41. The variable loss circuits $L_T$ and $L_R$ are provided with input and output terminals 73, 74 and 75, 76, respectively, and the variable loss circuit $1_R$ is provided with an output terminal 77. 78 shows a control terminal to which the output terminal of the comparator 49 shown in FIG. 3 is connected, 79 shows a terminal to which the output terminal 68 of the memory circuit 51 shown in FIG. 1 is connected and 80 shows a terminal to which the output terminal 69 of the memory circuit shown in FIG. 1 is connected. The variable loss circuit $L_T$ comprises three cascade connected operational amplifiers 81, 82 and 83, and the variable loss circuit $L_R$ also comprises three cascade connected operational amplifiers 84, 85 and 86. However, the variable loss circuit $1_R$ comprises a single operational amplifier 87, and the gains of these amplifiers are controlled by resistors 88 through 105, respectively. A plurality of field effect transistors 106 through 115 (hereinafter designated as MOSFET) are used and the gate biases thereof are controlled by the control signal $x$ applied to the control terminal 78. There are also provided MOSFETs 116 and 117 whose gate biases are controlled by the control signal $y$ applied to the control terminal 79, and MOSFETs 118, 119 and 120 whose gate biases are controlled by the control signal $z$ applied to the control terminal 80.

Figure 7:
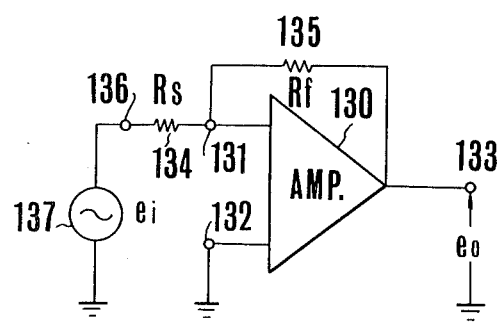
FIG. 7 is a diagram showing an amplifier circuit utilizing an operational amplifier.

FIG. 7 is a diagram for explaining an amplifier utilizing an operational amplifier designated by 130, and provided with an inverting input 131, a non-inverting input 132 and an output terminal 133. Resistors 134 and 135 are used to determine the gain of the amplifier. The amplifier has an input terminal 136 and a source of input signal 137.

Figure 8:
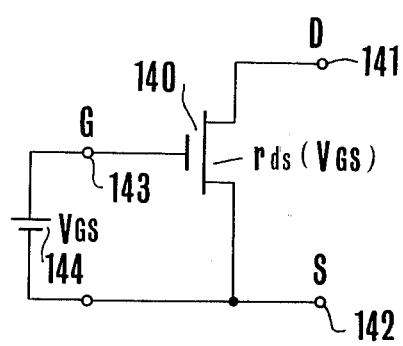
FIG. 8 is a diagram of a circuit utilizing a MOSFET.

FIG. 8 shows the connection of a MOSFET 140 including a drain terminal 141, a source terminal 142 and a gate terminal 143. A source of bias potential 144 is connected between the gate and source electrodes.

Figure 9:
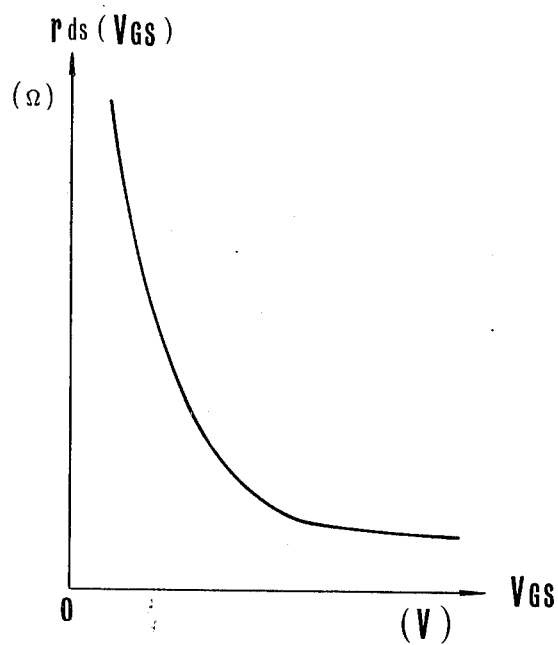
FIG. 9 shows a characteristic of a MOSFET.

FIG. 9 shows a characteristic curve of a MOSFET showing the manner of varying the differentiated resistance between the drain and source electrodes by varying the bias potential impressed across the gate and source electrodes. In FIG. 9, the abscissa represents the bias potential ($V_{GS}$) across the gate and source electrodes and the ordinate the resistance value $r_{ds}$ between the drain and source electrodes. As FIG. 9 shows, the differentiated resistance $r_{ds}$ across the drain and source electrode of a MOSFET decreases as the bias potential $V_{GS}$ across the gate and source electrodes increases.

In FIG. 6 all amplifiers are constituted by operational amplifiers whose gains are controlled by MOSFETs. The gain of such an amplifier can be expressed by an equation $$K = \frac{eo}{ei} = -R_f/R_s \qquad 1$$

where symbols $eo$, $ei$, $R_f$ and $R_s$ are the same as those shown in FIG. 7. Thus, the gain of the amplifier is determined by two resistors 134 and 135 and varies inversely proportional to the resistance $R_s$ on the input side, but is proportional to the feedback resistance $R_f$. When the drain and source electrodes of the MOSFET are connected across the input resistance $R_s$, the gain of the amplifier is expressed by an equation $$K = eo/ei = -R_f/[R_s//r_{ds}(V_{GS})] \qquad 2$$

where $[R_s//r_{ds}]$ represents the composite value of the resistance $R_s$ and the differentiated resistance $r_{ds}$ between the drain and source electrodes which are connected in parallel. As shown in FIG. 9, since the differentiated resistance between the drain and source electrodes of a MOSFET decreases as the bias potential $V_{GS}$ across the gate and source electrodes increases, it can be noted from said equation that the gain of the amplifier increases as the gate bias of the MOSFET is increased. Conversely, where the MOSFET is connected in parallel with the feedback resistor $R_f$ shown in FIG. 7, the gain of the amplifier will decrease as the gate bias of the MOSFET is increased.

In the circuit shown in FIG. 6, the gain of the amplifier is controlled by the MOSFET by utilizing this characteristic thereof. The operations of the operational amplifiers shown in FIG. 6 will first be described. In the following description $K_{83}$ represents the amplified gain of the operational amplifier 83, $r_{92}$ the value of resistor 92, $r_{ds}(x)$ the resistance across the drain and source electrodes of a MOSFET controlled by a signal $x$. The gains of the operational amplifiers 83 and 84 are shown by the following equations $$K_{83} = -r_{93}/[r_{92}//r_{ds}(x)] \qquad 3$$

$$K_{84} = -[r_{95}//r_{ds}(x)]/r_{94} \qquad 4$$

Assume now that the control signal $x$ varies within a range $0 \leq x \leq x_0$ and that $r_{ds}(x=0) \gg r_{92}, r_{95}$; $V_{ds}(x=x_0) \ll r_{92}, r_{95}$. Then the approximate values of the gains $K_{83}$ and $K_{84}$ for $x = 0, x_0$ are shown by $$K_{83}(x=0) \cong -r_{93}/r_{92} \quad\quad 5$$

$$K_{83}(x=x_0) \cong -r_{93}/r_{ds}(x=x_0) \quad\quad 6$$

$$K_{84}(x=0) \cong -r_{95}/r_{94} \quad\quad 7$$

$$K_{84}(x=x_0) \cong -r_{ds}(x=x_0)/r_{94} \quad\quad 8$$

From these equations, it can be noted that the absolute valve of the gain $K_{83}$ becomes a maximum under the transmitting condition ($x = x_0$) but becomes a minimum under the receiving condition ($x = 0$). In other words, the gain of the operational amplifier 83 is decreased under the receiving condition because the voice switch inserts a loss. The absolute value of gain $K_{84}$ becomes a minimum under the transmitting condition ($x = x_0$); whereas a maximum under the receiving condition. In other words, the gain of the operational amplifier 84 is decreased under the transmitting condition because the voice switch VS inserts a loss. In a range of $0 < x < x_0$, both gains $K_{83}$ and $K_{84}$ assume values between said maximum and minimum values. In this manner, the gains of the operational amplifiers 83 and 84 vary in the opposite direction as the signal $x$ varies, thus satisfying the solid line characteristic shown in FIG. 4.

The operation of the operational amplifiers 81 and 82 will now be described. The gains of these operational amplifiers are shown by the following equations $$K_{81} = -[r_{89} \mathbin{//} r_{ds}(x)] / [r_{88} \mathbin{//} r_{ds}(z) \mathbin{//} r_{ds}(x)] \quad\quad 9$$

$$K_{82} = -[r_{91} \mathbin{//} r_{ds}(x)] / [r_{90} \mathbin{//} r_{ds}(y) \mathbin{//} r_{ds}(x)] \quad\quad 10$$

assuming now that $r_{ds}(x=x_0) \ll r_{89}, [r_{88} \mathbin{//} r_{ds}(z)], r_{91},$ $[r_{90}//r_{ds}(y)]; r_{ds}(x=0) \gg r_{89}, [r_{88}//r_{ds}(z)],$ $[r_{90}//r_{ds}(y)], r_{91}$ then the approximate values of the gains $K_{81}$ and $K_{82}$ at $x = 0, x_0$ are given by the following equations $$K_{81}(x=0) \cong -r_{89}/[r_{88}//r_{ds}(z)] \quad\quad 11$$

$$K_{81}(x=x_0) \cong -1 \quad\quad 12$$

$$K_{82}(x=0) \cong -r_{91}/[r_{90}//r_{ds}(y)] \quad\quad 13$$

$$K_{82}(x=x_0) \cong -1 \quad\quad 14$$

These equations show that the absolute values of the gains $K_{81}$ and $K_{82}$ are equal to unity under the transmitting condition ($x = x_0$) so that where the system is under the transmitting condition, these gains have no relation with the operation of the system.

Equations 11 and 12 show that under the receiving condition ($x = 0$) the gains increase as the signals $y$ and $z$ increase and $r_{ds}(y)$ and $r_{ds}(z)$ decrease. Under the receiving condition, the loss is inserted on the transmitting side so that the gain of the operational amplifier 83 is decreased. As a consequence, where the gains of the operational amplifiers 81 and 82 are increased under the receiving condition, the loss inserted on the transmitting side by the voice switch is decreased.

In this manner, use of the operational amplifiers 81 and 82 decreases the loss inserted on the transmitting side by signals $y$ and $z$.

The gains of the operational amplifiers 85 and 86 are expressed by the following equations $$K_{85} = -\frac{[r_{98}//r_{ds}(x)] + r_{99}}{[r_{96}//r_{ds}(y)] + [r_{97}//r_{ds}(x)]} \quad\quad 15$$

$$K_{86} = -\frac{[r_{102}//r_{ds}(x)] + r_{103}}{[r_{100}//r_{ds}(z)] + [r_{101}//r_{ds}(x)]} \quad\quad 16$$

Putting now $r_{ds}(x=x_0) \ll r_{98}, r_{99}, r_{97}, [r_{96}//r_{ds}(y)], r_{102}, r_{103}, r_{101}, [r_{100}//r_{ds}(z)]$ and $r_{ds}(x=0) \gg r_{98} = r_{97} = r_{102} = r_{101} \gg r_{99}, [r_{96}//r_{ds}(y)], r_{103}, [r_{100}//r_{ds}(z)]$, then the approximate values of the gains $K_{85}$ and $K_{86}$ at $x = 0, x_0$ are given by the following equations $$K_{85}(x=0) \cong -\frac{r_{98}+r_{99}}{[r_{96}//r_{ds}(y)]+r_{97}} \cong \frac{-r_{98}}{r_{97}} = -1 \quad 17$$

$$K_{85}(x=x_0) \cong -\frac{r_{ds}(x=0)+r_{99}}{[r_{96}//r_{ds}(y)]+r_{ds}(x=x_0)}$$

$$\cong \frac{-r_{99}}{[r_{96}//r_{ds}(y)]} \quad\quad 18$$

$$K_{86}(x=0) \cong -\frac{r_{102}+r_{103}}{[r_{100}//r_{ds}(z)]+r_{101}}$$

$$\cong -\frac{r_{102}}{r_{101}} = -1 \quad\quad 19$$

$$K_{86}(x=x_0) \cong -\frac{r_{ds}(x=x_0)+r_{103}}{[r_{100}//r_{ds}(z)]+r_{ds}(x=x_0)}$$

$$\cong \frac{-r_{103}}{[r_{100}//r_{ds}(z)]} \quad\quad 20$$

These equations show that the absolute values of the gains $K_{85}$ and $K_{86}$ are equal to unity under the receiving conditions ($x = 0$) so that where the system is under the receiving condition, these gains have no relation with the operation of the system. Further, equations 18 and 20 show that under the transmitting condition ($x = x_0$) the gains increase as signals $y$ and $z$ increase and $r_{ds}(y)$ and $r_{ds}(z)$ decrease. Then, under the transmitting condition, the loss is inserted by the voice switch on the receiving side thereby decreasing the gain of the operational amplifier 84. As a result, increase of the gains of the operational amplifiers 85 and 86 decreases the loss inserted on the receiving side by the voice switch. In this manner, by using operational amplifiers 85 and 86, it is possible to decrease the loss inserted on the receiving side by signals $y$ and $z$.

Finally, the gain of the operational amplifier 87 is given by the following equation $$K_{87} = - [r_{105}//r_{ds}(z)]/r_{104} \qquad 21$$

This equation shows that it is possible to decrease the gain $K_{87}$ by decreasing $r_{ds}(z)$. In other words, it is possible to constitute the control variable loss circuit 41 [$1_R(z)$] shown in FIG. 1 with the operational amplifier 87.

Although in the foregoing description, it has been clarified that it is possible to control the inserted loss under the transmitting and receiving conditions, it should be understood that the variations of the gains of the operational amplifiers 81, 87 and 86 should be equal with respect to $r_{ds}(z)$. More particularly, when the gain of the operational amplifier 87 is decreased by 10dB under a control voltage of $z = z_0$, the gains of the operational amplifiers 81 and 86 should also be increased by 10dB, respectively, under receiving or transmitting condition. Such an interlocked operation can readily be realized. Thus, when the values of the resistors $r_{88}$, $r_{100}$ and $r_{105}$ to which $r_{ds}(z)$ is connected in parallel are made equal, the variations of the gains $K_{81}$, $K_{86}$ and $K_{87}$ with reference to the variation of $r_{ds}(z)$ will be equal. In the same manner, by making $r_{90} = r_{96}$, it is possible to make equal the variations of the gains $K_{82}$ and $K_{85}$ with respect to the variation of $r_{ds}(y)$.

FIG. 10 is a connection diagram of a modification of the circuit shown in FIG. 4 in which a microphone amplifier for amplifying the output of the microphone is substituted for the control variable amplifier 410 [$A_T(z)$] shown in FIG. 4 and controlled by the received signal. The circuit shown in FIG. 10 is identical to that shown in FIG. 4 except that the variable loss circuits 201 and 202 provided for the purpose of preventing howling are controlled by the control signals $x$ and $y$, and the microphone amplifier 200 and the speaker variable amplifier 203 are controlled by the control signals $x$ and $z$. Accordingly, the only operation which is different from that of the circuit shown in FIG. 4 will be described in the following. Consider now a case wherein the receiving signal is applied to the circuit shown in FIG. 10 and the circuit has turned to the receiving condition. Under this condition, the gain of the variable amplifier 203 is set to a rated gain by the control signal $x$ for obtaining an appropriate listening level, whereby the gain will not be affected by the control signal $z$. On the other hand, the gain of the variable amplifier 200 is set to a rated gain when the control signal $z = 0$, but the gain of the variable amplifier 200 increases with the increase in the control signal $z$. In other words, in the circuit shown in FIG. 6, under the receiving condition the variable amplifier 200 operates just in the same manner as the control variable amplifier 410 shown in FIG. 4. Consequently, the gain of the variable amplifier 200 increases by an amount equal to the decrease in the acoustic coupling between the microphone and the loudspeaker. This means that where the variable amplifier 200, the variable loss circuit 201 and the amplifier 3 are considered to constitute the whole transmitting system, the loss inserted by the voice switch on the transmitting side is decreased by an amount equal to the increase in the gain of the variable amplifier 200.

When the condition of the circuit is switched from the receiving to the transmitting condition, due to polarity change of the control signal $x$, the gain of the variable amplifier 200 returns to the rated gain. On the other hand, the gain of the variable amplifier 203 is increased by the control signal $z$ by an amount equal to the increase of the gain of the variable amplifier 200 (that is the decrease in the acoustic coupling between the microphone and the loudspeaker) under the previous receiving condition.

FIG. 11 shows the detail of the circuit shown in FIG. 10. The circuit shown in FIG. 11 is identical to that shown in FIG. 6 except that the control variable loss circuit 72 is removed from the circuit shown in FIG. 6 and an amplifier comprising operational amplifiers 81 and 86 are used as the control variable amplifier.

According to the prior art, where the line loss is 10dB, it has been necessary to insert a large loss of about 30dB by the voice switch, but in the circuit embodying the invention, the loss is automatically decreased by about 20dB so that the voice switch is required to insert a loss of only 10dB. This inserted loss of 10dB is so small that the user does not feel the presence of the voice switch at the time of speech.

While the invention has been shown and described in terms of specific embodiments thereof, it should be understood that the invention is by no means limited to these specific embodiments and that many changes and modifications will readily occur to one skilled in the art without departing from the true spirit and scope of the invention as defined in the appended claims.

What is claimed is:

1. A loudspeaking telephone circuit comprising a first rectifier-filter circuit connected to a transmitting path for rectifying and filtering a signal transmitted through said transmitting path, a second rectifier-filter circuit connected to a receiving path for rectifying and filtering a signal received by said receiving path, a main comparator for comparing the outputs from said first and second rectifier-filter circuits, a resistance attenuator for attenuating an output from said first or second rectifier-filter circuit, a control comparator for comparing the output from said resistance attenuator with the output from said first or second rectifier-filter circuit which does not supply an output to said resistance attenuator, a memory device for memorizing the output from said control comparator, and a transmitting circuit variable loss means connected in said transmitting path and a receiving circuit variable loss means connected in a receiving path which give an insertion loss to a talking path in response to the output from said main comparator with said memory device as a parameter for both of said loss means.

2. The loudspeaking telephone circuit according to claim 1 which further comprises a reset device for resetting the content memorized in said memory device when the external utilization condition of the telephone set varies the distance between a loudspeaker connected to the receiving path and a microphone connected to the transmitting path.

3. The loudspeaking telephone circuit according to claim 1 wherein said resistance attenuator is connected to attenuate the output from said first rectifier-filter circuit connected to said tansmitting path.

4. A loudspeaking telephone circuit according to claim 1 which further comprises a reset means for resetting the content memorized in said memory device when the external utilization condition of telephone set varies the anti-sidetone characteristic of an anti-sidetone circuit.

5. A loudspeaking telephone circuit comprising a first rectifier-filter circuit connected to a transmitting path for rectifying and filtering a signal transmitted through said transmitting path, a second rectifier-filter circuit connected to a receiving path for rectifying and filtering a signal received by said receiving path, a main comparator for comparing the output from said first and second rectifier-filter circuits, a resistance attenuator for attenuating the output from said second rectifier-filter circuit, a control comparator for comparing the output from said resistance attenuator with the output from said first rectifier-filter circuit, a memory device for memorizing the output from said control comparator a control variable loss device connected between said receiving path and said second rectifier-filter circuit, said control variable loss device increasing its loss when the output from said memory device increases, and a transmitting circuit variable loss means connected in the transmitting path and a receiving circuit variable loss means connected in the receiving path which give an insertion loss to a talking path by utilizing the outputs from said main comparator and said memory device as parameters for both of said loss means.

6. The loudspeaking telephone circuit according to claim 5 which further comprises reset means for erasing the output from said control comparator that has been memorized in said memory device when the distance between the loudspeaker and the microphone of the telephone set is varied during the use thereof.

7. A loudspeaking telephone circuit comprising a first rectifier-filter circuit connected to a transmitting path for rectifying and filtering a signal tranmitted through said transmitting path, a second rectifier-filter circuit connected to a receiving path for rectifying and filtering a received signal, a main comparator for comparing the outputs from said first and second rectifier-filter circuits, a resistance attenuator for attenuating the output from said second rectifier-filter circuit, a control comparator for comparing the output from said first rectifier-filter circuit with the output from said resistance attenuator, a memory device for memorizing the output from said control comparator, control variable gain device connected between the transmitting path and said first rectifier-filter circuit, said control variable gain device increasing the gain thereof when the output from said memory device increases, and a transmitting circuit variable loss means connected in the transmitting path and a receiving circuit variable loss means connected in the receiving path, both said variable loss means giving an insertion loss to a talking path by utilizing the output from said main comparator and the output from said memory device as parameters.

8. The loudspeaking telephone circuit according to claim 7 which further comprises reset means for erasing the output from said control comparator that has been memorized in said memory device when the distance between the microphone and the loudspeaker of the telephone set is varied during the use thereof.

9. A loudspeaking telephone circuit comprising a first rectifier-filter circuit connected to a transmitting path for rectifying and filtering a signal transmitted through said transmitting path, a second rectifier-filter circuit connected to a receiving path for rectifying and filtering a received signal, a main comparator for comparing the outputs from said first and second rectifier-filter circuits, a resistance attenuator for attenuating the output from said second rectifier-filter circuit, a control comparator for comparing the output from said resistance attenuator with the output from said first rectifier-filter circuit, a memory device for memorizing the output from said control comparator, and a transmitting circuit variable gain device connected in the transmitting path and a receiving circuit variable gain device connected in the receiving path which are both controlled in accordance with the output from said memory device and the output of said main comparator as a parameter.

10. The loudspeaking telephone circuit according to claim 9 which further comprises a reset device for erasing the output from said control comparator that has been stored in said memory device when the distance between the loudspeaker and the microphone of the telephone set is varied during the use thereof.

11. A loudspeaking telephone circuit comprising a first rectifier-filter circuit connected to a transmitting path for rectifying and filtering a signal transmitted through said transmitting path, a second rectifier-filter circuit connected to a receiving path for rectifying and filtering a signal received from said receiving path, a main comparator for comparing the outputs of said first and second rectifier-filter circuits, a first resistance attenuator for attenuating the output from said second rectifier-filter circuit, a first control comparator for comparing the output from said first resistance attenuator with the output from said first rectifier-filter circuit, a first memory device for memorizing the output from said first control comparator, a control variable loss device connected between said receiving path and said second rectifier-filter circuit, said control variable loss device increasing its loss when the output from said first memory device increases, a second resistance attenuator for attenuating the output from said first rectifier-filter circuit, a second control comparator for comparing the output from said second resistance attenuator with the output from said second rectifier-filter circuit, a second memory device for memorizing the output from said second control comparator, a first reset device for erasing the content of said first memory device when the distance between the loudspeaker and the microphone of the telephone set is varied during the use thereof, a second reset device for erasing the content of said second memory device when the side tone equilibrium condition is broken while said telephone set is being used, and a transmitting circuit variable loss device connected in the transmitting path and a receiving circuit variable loss device connected in the receiving path which give an insertion loss to a talking path by utilizing the output from said main comparator and the output from said first and second memory devices as the parameters for both said transmitting circuit variable loss device and said receiving circuit variable loss device.

12. A loudspeaking telephone circuit comprising a first rectifier-filter circuit connected to a transmitting path for rectifying and filtering a signal transmitted through said transmitting path, a second rectifier-filter circuit connected to a receiving path for rectifying and filtering a signal received from the receiving path, a main comparator for comparing the outputs from said first and second rectifier-filter circuits, a first resistance attenuator for attenuating the output from said second rectifier-filter circuit, a first control comparator for comparing the output from said first resistance attenuator with the output from said first rectifier-filter circuit, a first memory device for memorizing the output of said first control comparator, a control variable gain device connected between said transmitting path and said first rectifier-filter circuit, said control variable gain device increasing its gain when the output from said first memory device increases, a second resistance attenuator for attenuating the output from said first rectifier-filter circuit, a second control comparator for comparing the output from said second resistance attenuator with the output from said second rectifier-filter circuit, a second memory device for memorizing the output from said second control comparator, first reset device for erasing the content of said first memory device when the distance between the loudspeaker and the microphone of the telephone set is varied while the telephone set is being used, a second reset device for erasing the content of said second memory device when the equilibrium of the side tone is broken while the telephone set is being used, and a transmitting circuit variable loss device connected in the transmitting path and a receiving circuit variable loss device connected in the receiving path which give an insertion loss to a talking path by utilizing the output from said main comparator device and the outputs from said first and second memory devices as parameters for both of said loss devices.

13. A loudspeaking telephone circuit comprising a first rectifier-filter circuit connected to the transmitting path for rectifying and filtering a signal transmitted through said transmitting path, a second rectifier-filter circuit connected to a receiving path for rectifying and filtering a signal received from said receiving path, a main comparator circuit for comparing the outputs from said first and second rectifier-filter circuits, a first resistance attenuator for attenuating the output from said second rectifier-filter circuit, a first control comparator for comparing the output from said first resistance attenuator with the output from said first rectifier-filter circuit, a first memory device for memorizing the output from said first comparator device, a second resistance attenuator for attenuating the output from said first rectifier-filter circuit, a second control comparator for comparing the output from said second resistance attenuator with the output from said second rectifier-filter circuit, a second memory device for memorizing the output from said second comparator device, a first reset device for erasing the content of said first memory device when the distance between the loudspeaker and the microphone of the telephone set is varied while the telephone set is being used, a second reset device for erasing the content of the second memory device when the side tone equilibrium is broken while the telephone is being used, a transmitting circuit variable gain device connected in the transmitting path and a receiving circuit variable gain device connected in the receiving path which are both controlled by utilizing the output from said main comparator and the output from said first memory device as the parameter, a transmitting circuit variable loss device connected in the transmitting path and a receiving circuit variable loss device connected in the receiving path which are both controlled by utilizing the output from said main comparator and the output from said second memory device as the parameters.

* * * * *